US009323468B2

(12) United States Patent
Oyama et al.

(10) Patent No.: US 9,323,468 B2
(45) Date of Patent: Apr. 26, 2016

(54) COMPUTER SYSTEM AND DATA INPUT/OUTPUT METHOD

(75) Inventors: Kazuhiro Oyama, Hadano (JP); Hiroshi Yokouchi, Yokohama (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 13/574,929

(22) PCT Filed: Feb. 6, 2012

(86) PCT No.: PCT/JP2012/052619
§ 371 (c)(1),
(2), (4) Date: Jul. 24, 2012

(87) PCT Pub. No.: WO2013/118243
PCT Pub. Date: Aug. 15, 2013

(65) Prior Publication Data
US 2014/0359212 A1 Dec. 4, 2014

(51) Int. Cl.
*G06F 3/06* (2006.01)

(52) U.S. Cl.
CPC .............. *G06F 3/0635* (2013.01); *G06F 3/061* (2013.01); *G06F 3/067* (2013.01); *G06F 3/0653* (2013.01); *G06F 3/0658* (2013.01); *G06F 3/0689* (2013.01)

(58) Field of Classification Search
None
See application file for complete search history.

(56) References Cited

U.S. PATENT DOCUMENTS

| | | | | |
|---|---|---|---|---|
| 7,603,485 B2 * | 10/2009 | Komikado | ............... | G06F 3/061 710/5 |
| 7,865,676 B2 * | 1/2011 | Nagata | .................... | G06F 3/061 709/217 |
| 8,108,562 B2 * | 1/2012 | Komikado | ............... | G06F 3/061 710/5 |
| 8,146,092 B2 * | 3/2012 | Ogawa | .................... | G06F 3/061 712/10 |
| 2005/0108450 A1 | 5/2005 | Sahara et al. | | |
| 2006/0050630 A1 | 3/2006 | Kobayashi et al. | | |
| 2008/0126581 A1 * | 5/2008 | Komikado | .............. | G06F 3/061 710/5 |
| 2008/0301385 A1 * | 12/2008 | Nagata | .................... | G06F 3/061 711/162 |

(Continued)

FOREIGN PATENT DOCUMENTS

| | | | |
|---|---|---|---|
| JP | 2001-167040 A | 6/2001 | |
| JP | 2005-149276 A | 6/2005 | |

(Continued)

OTHER PUBLICATIONS

Webopedia, "Server", Apr. 10, 2001, pp. 1-2, https://web.archive.org/web/20010410061959/http://webopedia.com/TERM/S/server.html.*

(Continued)

*Primary Examiner* — Christopher D Birkhimer
(74) *Attorney, Agent, or Firm* — Mattingly & Malur, P.C.

(57) ABSTRACT

A storage apparatus includes multiple ports communicable with a server, multiple processor cores and multiple LUs (Logical Units). For each port, a port responsible core, which is a processor core to accept an I/O request received by the port, is specified. For each LU, an LU responsible core, which is a processor core responsible for I/O, is specified. The LU responsible core may be dynamically changed. The server periodically acquires identification information about the LU responsible cores from the storage apparatus. When transmitting an I/O request, the server selects a non-cross call path, which is such a path that the LU responsible core and the port responsible core are the same processor core, from among multiple paths to an I/O destination LU, which is an LU specified by the transmission target I/O request, and transmits the transmission target I/O request via the selected path.

15 Claims, 18 Drawing Sheets

(56) References Cited

U.S. PATENT DOCUMENTS

| | | |
|---|---|---|
| 2009/0006876 A1 | 1/2009 | Fukatani et al. |
| 2009/0044000 A1 | 2/2009 | Nakayama et al. |
| 2010/0077106 A1* | 3/2010 | Komikado ............ G06F 3/061 710/5 |
| 2010/0115154 A1 | 5/2010 | Tomonaga et al. |
| 2010/0325339 A1* | 12/2010 | Ogawa et al. ................ 711/103 |
| 2011/0072228 A1* | 3/2011 | Nagata .................... G06F 3/061 711/162 |
| 2012/0159012 A1 | 6/2012 | Serizawa et al. |

FOREIGN PATENT DOCUMENTS

| | | |
|---|---|---|
| JP | 2006-79355 A | 3/2006 |
| JP | 2008-269424 A | 11/2008 |
| JP | 2008-299434 A | 12/2008 |
| JP | 2009-9194 A | 1/2009 |
| JP | 2010-108300 A | 5/2010 |

OTHER PUBLICATIONS

International Searching Authority, Written Opinion received in corresponding PCT Application No. PCT/JP2012/052619, issued on May 1, 2012.

\* cited by examiner

Fig. 13

| Path ID | Vendor name | Product name | Product number | LU number | LDEV number | Path status | CHA port | Accepting controller number | Port-responsible core number |
|---|---|---|---|---|---|---|---|---|---|
| 00001 | HIT | 600F | 9300080 | LU0 | 0010 | Online | 0A | 0 | X |
| 00002 | HIT | 600F | 9300080 | LU1 | 0011 | Online | 0A | 0 | X |
| 00003 | HIT | 600F | 9300080 | LU2 | 0012 | Online | 0A | 0 | X |
| 00004 | HIT | 600F | 9300080 | LU0 | 0010 | Online | 0E | 0 | Y |
| 00005 | HIT | 600F | 9300080 | LU1 | 0011 | Online | 0E | 0 | Y |
| 00006 | HIT | 600F | 9300080 | LU2 | 0012 | Online | 0E | 0 | Y |
| 00007 | HIT | 600F | 9300080 | LU0 | 0010 | Online | 1A | 1 | X |
| 00008 | HIT | 600F | 9300080 | LU1 | 0011 | Online | 1A | 1 | X |
| 00009 | HIT | 600F | 9300080 | LU2 | 0012 | Online | 1A | 1 | X |
| 00010 | HIT | 600F | 9300080 | LU0 | 0010 | Online | 1E | 1 | Y |
| 00011 | HIT | 600F | 9300080 | LU1 | 0011 | Online | 1E | 1 | Y |
| 00012 | HIT | 600F | 9300080 | LU2 | 0012 | Online | 1E | 1 | Y |

Fig. 14

| Path ID | Vendor name | Product name | Product number | LU number | LDEV number | Path status | CHA port | Accepting controller number | Port-responsible core number |
|---------|-------------|--------------|----------------|-----------|-------------|-------------|----------|-----------------------------|------------------------------|
| 00001 | HIT | 600F | 9300080 | LU10 | 0020 | Online | 0B | 0 | X |
| 00002 | HIT | 600F | 9300080 | LU11 | 0021 | Online | 0B | 0 | X |
| 00003 | HIT | 600F | 9300080 | LU12 | 0022 | Online | 0B | 0 | X |
| 00004 | HIT | 600F | 9300080 | LU10 | 0020 | Online | 0E | 0 | Y |
| 00005 | HIT | 600F | 9300080 | LU11 | 0021 | Online | 0F | 0 | Y |
| 00006 | HIT | 600F | 9300080 | LU12 | 0022 | Online | 0F | 0 | Y |
| 00007 | HIT | 600F | 9300080 | LU10 | 0020 | Online | 1B | 1 | X |
| 00008 | HIT | 600F | 9300080 | LU11 | 0021 | Online | 1B | 1 | X |
| 00009 | HIT | 600F | 9300080 | LU12 | 0022 | Online | 1B | 1 | X |
| 00010 | HIT | 600F | 9300080 | LU10 | 0020 | Online | 1F | 1 | Y |
| 00011 | HIT | 600F | 9300080 | LU11 | 0021 | Online | 1F | 1 | Y |
| 00012 | HIT | 600F | 9300080 | LU12 | 0022 | Online | 1F | 1 | Y |

Fig. 15

| Path ID | Vendor name | Product name | Product number | LU number | LDEV number | Path status | CHA port | Accepting controller number | Port-responsible core number |
|---|---|---|---|---|---|---|---|---|---|
| 00001 | HIT | 600F | 9300080 | LU20 | 0030 | Online | 0C | 0 | X |
| 00002 | HIT | 600F | 9300080 | LU21 | 0031 | Online | 0C | 0 | X |
| 00003 | HIT | 600F | 9300080 | LU22 | 0032 | Online | 0C | 0 | X |
| 00004 | HIT | 600F | 9300080 | LU20 | 0030 | Online | 0G | 0 | Y |
| 00005 | HIT | 600F | 9300080 | LU21 | 0031 | Online | 0G | 0 | Y |
| 00006 | HIT | 600F | 9300080 | LU22 | 0032 | Online | 0G | 0 | Y |
| 00007 | HIT | 600F | 9300080 | LU20 | 0030 | Online | 1C | 1 | X |
| 00008 | HIT | 600F | 9300080 | LU21 | 0031 | Online | 1C | 1 | X |
| 00009 | HIT | 600F | 9300080 | LU22 | 0032 | Online | 1C | 1 | X |
| 00010 | HIT | 600F | 9300080 | LU20 | 0030 | Online | 1G | 1 | Y |
| 00011 | HIT | 600F | 9300080 | LU21 | 0031 | Online | 1G | 1 | Y |
| 00012 | HIT | 600F | 9300080 | LU22 | 0032 | Online | 1G | 1 | Y |

| Vendor name | Product name | Product number | LDEV number | Controller number | CPU core number | I/O path control |
|---|---|---|---|---|---|---|
| | 114a | 114b | 114c | 114d | 114e | 114f | 114g |
| HIT | 600F | 9300080 | 0010 | 0 | X | ON |
| HIT | 600F | 9300080 | 0011 | 0 | Y | ON |
| HIT | 600F | 9300080 | 0012 | 1 | X | ON |

Fig. 17

| Vendor name | Product name | Product number | LDEV number | Controller number | LU-responsible core number | I/O path control |
|---|---|---|---|---|---|---|
| HIT | 600F | 9300080 | 0020 | 1 | Y | ON |
| HIT | 600F | 9300080 | 0021 | 0 | X | ON |
| HIT | 600F | 9300080 | 0022 | 0 | Y | ON |

Fig. 18

| Vendor name | Product name | Product number | LDEV number | Controller number | LU-responsible core number | I/O path control |
|---|---|---|---|---|---|---|
| HIT | 600F | 9300080 | 0030 | 1 | X | ON |
| HIT | 600F | 9300080 | 0031 | 1 | Y | ON |
| HIT | 600F | 9300080 | 0032 | 0 | X | ON |

Fig. 20

| Acceptance number | LDEV number | Accepting controller number | Port-responsible core number | Processing controller number | LU-responsible core number |
|---|---|---|---|---|---|
| 000001 | 0010 | 1 | Y | 0 | X |
| 000002 | 0020 | 1 | X | 1 | Y |
| 000003 | 0022 | 1 | X | 0 | Y |
| 000004 | 0030 | 0 | Y | 1 | X |
| 000005 | 0031 | 0 | X | 1 | Y |

COMPUTER SYSTEM AND DATA INPUT/OUTPUT METHOD

TECHNICAL FIELD

The present invention relates to I/O (Input/Output) to/from an LU (Logical Unit) in a storage apparatus from a server.

BACKGROUND ART

In general, a computer system includes a storage apparatus which includes LUs, and a server coupled with the storage apparatus. The server transmits an I/O request for inputting/outputting data to/from an LU of the storage apparatus. The storage apparatus receives the I/O request and inputs/outputs data in accordance with the I/O request, to/from the LU specified by the I/O request. An LU is a logical storage device, and it may be also called a logical volume. The LU may be a virtual LU or a real LU. The virtual LU may be, for example, an LU in accordance with thin provisioning or may be an LU in accordance with a storage virtualization technique (an LU obtained by virtualizing a storage resource of a storage apparatus outside the storage apparatus). The real LU is an LU based on a physical storage device (hereinafter referred to as a PDEV). For example, one or more real LUs are formed on the basis of a RAID (Redundant Array of Independent (or Inexpensive) Disks) group configured by multiple PDEVs.

There is such a storage apparatus that includes multiple processors and is able to determine which processor is responsible for I/O to/from which LU. With relation to such a storage apparatus, there is known a technique for changing a processor responsible for an LU according to the load of the processor (for example, see Patent Literature 1).

There is also known a technique in which multiple paths are prepared from a server to an LU, and the load of a network or the load of a port of a storage apparatus is distributed by controlling a path selected from among the multiple paths.

CITATION LIST

Patent Literature

[Patent Literature 1]
Japanese Patent Laid-Open No. 2008-269424

SUMMARY OF INVENTION

Technical Problem

A path selected from among multiple paths is switched, for example, by a round-robin method. Therefore, in a storage apparatus in which a processor (or a processor core) responsible for an LU is specified, there may be a case that a processor (or a processor core) which has accepted an I/O request via a path selected by a server is different from a processor (or a processor core) responsible for an LU specified by the I/O request. In this case, a so-called cross call occurs. The "cross call" stated here means that an I/O request is given and received between processors (or processor cores), that is, an I/O request is transferred from a processor (or a processor core) which has accepted the I/O request to a processor (or a processor core) responsible for an LU specified by the I/O request. There is a possibility that the performances of both of the processors (or processor cores) giving and receiving the I/O request decrease due to occurrence of the cross call.

Solution to Problem

A storage apparatus includes multiple ports communicable with a server, multiple processor cores and multiple LUs. For each port, a port responsible core, which is a processor core to accept an I/O request received by the port, is specified. For each LU, an LU responsible core, which is a processor core responsible for I/O, is specified. The LU responsible core may be dynamically changed. The server periodically acquires identification information about the LU responsible cores from the storage apparatus. When transmitting an I/O request, the server selects a non-cross call path, which is such a path that the LU responsible core and the port responsible core are the same processor core, from among multiple paths to an I/O destination LU, which is an LU specified by the transmission target I/O request, and transmits the transmission target I/O request via the selected path.

BRIEF DESCRIPTION OF DRAWINGS

FIG. 13 is a diagram showing an example of a path table of a server 1 according to the embodiment.

FIG. 14 is a diagram showing an example of a path table of a server 2 according to the embodiment.

FIG. 15 is a diagram showing an example of a path table of a server 3 according to the embodiment.

FIG. 16 is a diagram showing an example of an owner path table of the server 1 according to the embodiment.

FIG. 17 is a diagram showing an example of an owner path table of the server 2 according to the embodiment.

FIG. 18 is a diagram showing an example of an owner path table of the server 3 according to the embodiment.

FIG. 20 is a diagram showing an example of a cross call table according to the embodiment.

DESCRIPTION OF EMBODIMENT

An embodiment will be described with reference to drawings. The embodiment described below does not limit the present invention according to the claims, and all of various components and combinations thereof described in the embodiment are not necessarily required for solution means of the present invention.

Though various kinds of information may be described with the use of an expression of "aaa table" in the description below, the various kinds of information may be expressed in a data structure other than a table. An "aaa table" can be called "aaa information" in order to indicate that the information does not depend on a data structure.

Furthermore, expressions of "identification information", "identifier", "code", "name", "ID" and "number" are used at the time of describing the contents of each information, these can be replaced with one another.

In the description below, "program" may be used as a subject. However, because a program performs a specified process using a memory and a communication port by being executed by a processor (typically a CPU (Central Processing Unit)), description may be made with a processor as a subject. A process disclosed with a program as a subject may be a process executed by a computer, such as a server and a storage apparatus, or an information processing apparatus. A part or all of the program may be realized by dedicated hardware. Various kinds of programs may be installed in each computer by a program distribution server or a computer-readable storage medium.

First, a cross call will be described.

Figure 1:
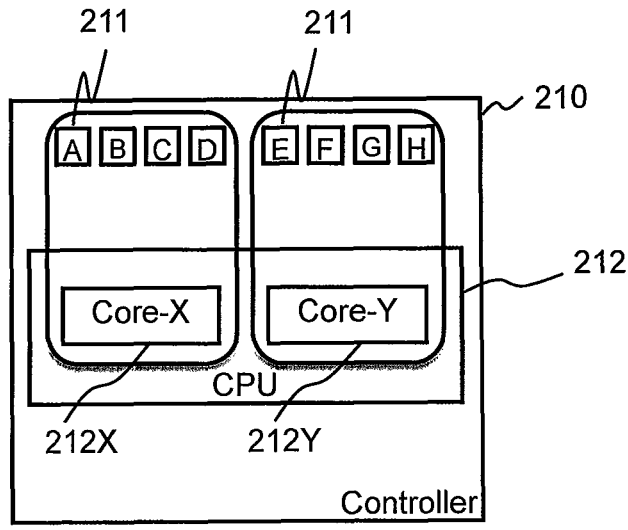
FIG. 1 is a diagram showing the outline of a controller which a storage apparatus includes according to an embodiment.

FIG. 1 is a diagram illustrating the outline of a controller of a storage apparatus.

The storage apparatus is provided with one or more controllers 210. The controller 210 is provided with a CPU 212 which includes multiple (for example, two) CPU cores (hereinafter referred to as cores) 212X and 212Y. The controller 210 is also provided with multiple (for example, eight) communication ports (hereinafter referred to as ports) 211 for intermediating communication with an apparatus such as a server. In the controller 210, the core 212X (also referred to as Core-X) is responsible for communication processing using ports A through D, and the core 212Y (also referred to as Core-Y) is responsible for communication processing using ports E through H.

Figure 2:
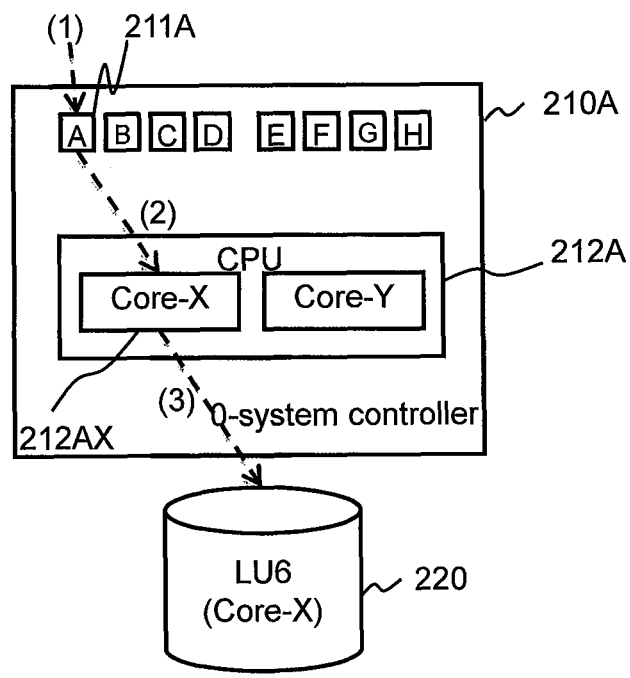
FIG. 2 is a diagram illustrating an example of I/O processing for an LU.

FIG. 2 is a diagram illustrating an example of I/O processing for an LU.

In FIG. 2, an LU 6 is shown as an example of an LU 220. The core responsible for I/O processing for the LU 6 is Core-X (a core 212AX) of a 0-system controller 210A. A responsible core is specified for each port 211.

When the port A receives an I/O request for the LU 6 (FIG. 2 (1)), the core 212AX responsible for the port A accepts the I/O request (FIG. 2 (2)). Here, because the core 212AX responsible for the LU 6 accepts the I/O request, a cross call does not occur. That is, the core 212AX executes I/O for the LU 6 in accordance with the I/O request and need not transfer the I/O request to another core (FIG. 2 (3)).

Figure 3:
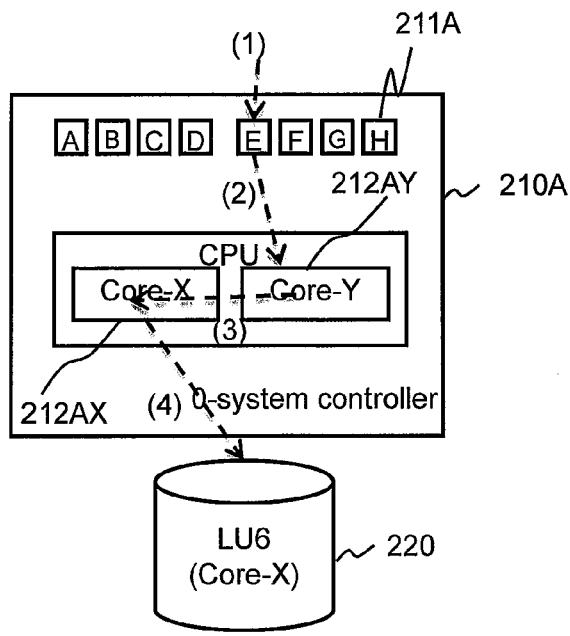
FIG. 3 is a diagram illustrating an example of a core cross call.

FIG. 3 is a diagram illustrating an example of a core cross call.

The core cross call means a cross call between cores. In FIG. 3, the core responsible for the LU 6 is Core-X (the core 212AX) of the 0-system controller 210A.

Here, when the port E receives an I/O request specifying the LU 6 (FIG. 3 (1)), a core 212AY responsible for the port E accepts the I/O request (FIG. 3 (2)). Here, the core responsible for the LU 6 is not the core 212AY which has accepted the I/O request but the other core 212AX. Therefore, a core cross call occurs in the one CPU 212. That is, the I/O request is handed over from the core 212AY to the core 212AX (FIG. 3 (3)). The core 212AX which has accepted the I/O request executes I/O for the LU 6 ((4) in FIG. 3). In this way, when a core cross call occurs, the load for giving and receiving an I/O request is applied to both of the cores 212AX and 212AY. The load on the CPU due to the core cross call is lower than the load due to a CPU cross call to be described later.

Figure 4:
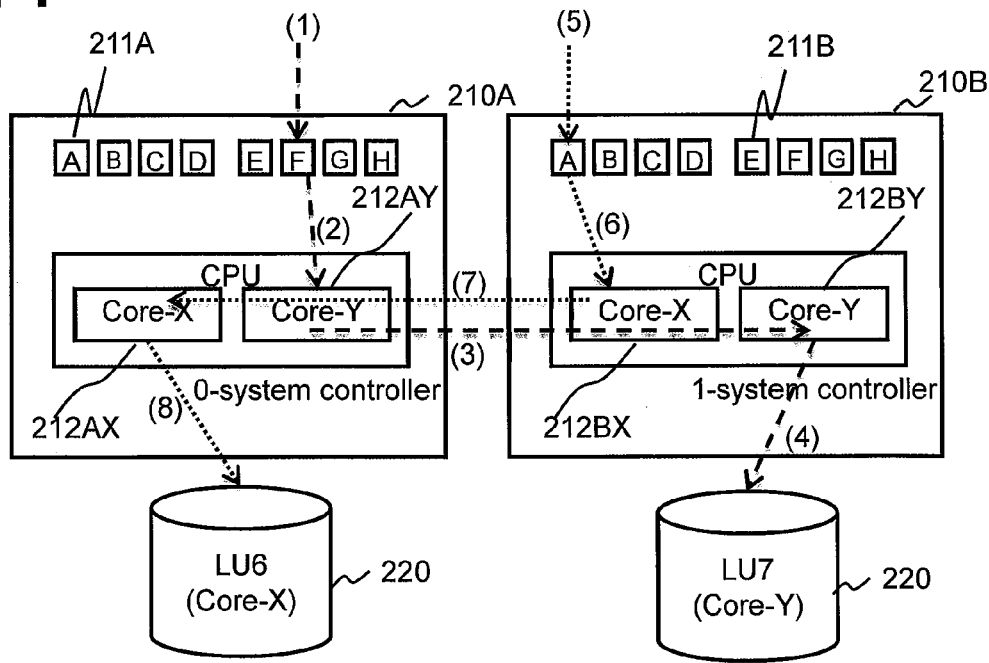
FIG. 4 is a diagram illustrating an example of a CPU cross call.

FIG. 4 is a diagram illustrating an example of a CPU cross call.

The CPU core cross call means a cross call between CPUs. A CPU cross call may occur in the same controller or may occur between controllers. In the description below, the expression of "cross call" means both of the core cross call and the CPU cross call.

In FIG. 4, two controllers, the 0-system controller 210A and a 1-system controller 210B, exist in the storage apparatus. The core responsible for the LU 6 is Core-X (the core 212AX) of the 0-system controller 210A, and the core responsible for an LU 7 is Core-Y (a core 212BY) of the 1-system controller 210B.

When the port F of the 0-system controller 210A receives an I/O request specifying the LU 7 (FIG. 4 (1)), the core 212AY responsible for the port F accepts the I/O request (FIG. 4 (2)). Here, the core responsible for the LU 7 is not the core 212AY which has accepted the I/O request but the core 212BY of the 1-system controller 210B. Therefore, a CPU cross call occurs. That is, the I/O request is transferred from the CPU which includes the core 212AY, to the core 212BY of another CPU (FIG. 4 (3)). The core 212BY which has accepted the I/O request executes I/O for the LU 7 ((4) in FIG. 4).

On the other hand, when the port A of the 1-system controller 210B receives an I/O request specifying the LU 6 (FIG. 4 (5)), a core 212BX responsible for the port A accepts the I/O request (FIG. 4 (6)). Here, the core responsible for the LU 6 is not the core 212BX which has accepted the I/O request but the core 212AX of the 0-system controller 210A. Therefore, a CPU cross call occurs. That is, the I/O request is transferred from the CPU which includes the core 212BX, to the CPU which includes another core 212AX (FIG. 4 (7)). The core 212AX which has accepted the I/O request executes I/O for the LU 6 (FIG. 4 (8)).

As described above, when a CPU cross call occurs, the load for executing the CPU cross call is applied to both of the CPUs.

Figure 5:
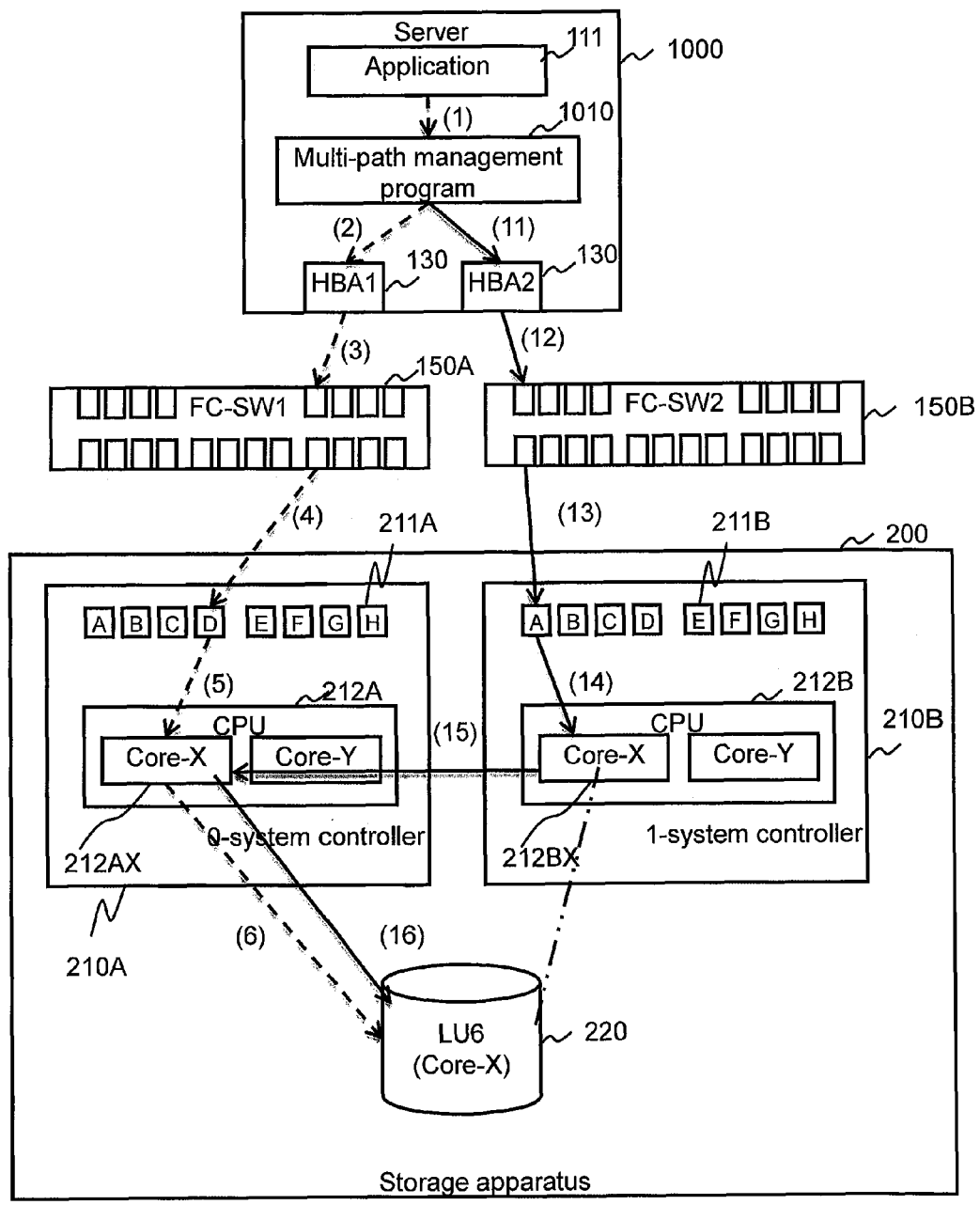
FIG. 5 is a diagram illustrating occurrence of an example of a cross call.

FIG. 5 is a diagram illustrating occurrence of an example the cross call.

A server 1000 is coupled with multiple (for example, two) switches 150A and 150B (FC-SW1 and FC-SW2), for example, via an optical fiber cable, and the two switches 150A and 150B are coupled with a storage apparatus 200, for example, via an optical fiber cable.

As shown in FIG. 5, in the computer system, there are prepared, for example, a path via HBA1 of the server 1000, FC-SW1 and the port D of the 0-system controller 210A, and a path via HBA2 of the server 1000, FC-SW2 and the port A of the 1-system controller 210B, as paths to the LU 6.

An application program (hereinafter referred to as an application 111) and a multi-path management program 1010 are executed by the CPU of the server 1000. The application 111 issues an I/O request specifying, for example, the LU 6. The multi-path management program 1010 selects a path for causing the I/O request issued from the application 111 (the I/O request specifying the LU 6) to pass through, from among the multiple paths to the same LU 6. The multi-path management program 1010 selects one path from the multiple paths, for example, by a round-robin method, and transmits the I/O request issued from the application 111 using the selected path. Therefore, the I/O request specifying the LU 6 can reach the storage apparatus 200 through any of the two paths to the LU 6.

Here, in the storage apparatus 200, the core responsible for the LU 6 is Core-X (the core 212AX) of the 0-system controller 210A.

In this case, the I/O request issued from the application 111 is communicated to the multi-path management program 1010 (FIG. 5 (1)), and the path for the I/O request to pass through is selected by the multi-path management program 1010.

If the multi-path management program 1010 selects the path via HBA1, FC-SW1 and the port D of the 0-system controller 210A as the path for the I/O request specifying the LU 6 to pass through, the multi-path management program 1010 hands over the I/O request to HBA1 (FIG. 5 (2)). The I/O request handed over to HBA1 is transmitted from HBA1 to FC-SW1 (FIG. 5 (3)) and is transmitted from FC-SW1 to the port D of the 0-system controller 210A (FIG. 5 (4)).

The port D receives the I/O request specifying the LU 6, the core 212AX responsible for the port D accepts the I/O request (FIG. 5 (5)). Here, the core responsible for the LU 6 is the core 212AX which has accepted the I/O request. Therefore, a cross call does not occur, and the core 212AX executes I/O for the LU 6 (FIG. 5 (6)).

On the other hand, if the multi-path management program 1010 selects the path via HBA2, FC-SW2 and the port A of the 1-system controller 210B as the path for the I/O request specifying the LU 6 to pass through, the multi-path management program 1010 hands over the I/O request to HBA2 (FIG. 5 (11)). The I/O request handed over to HBA2 is transmitted from HBA2 to FC-SW2 (FIG. 5 (12)) and is transmitted from FC-SW2 to the port A of the 1-system controller 210B (FIG. 5 (13)).

When the port A of the 1-system controller 210B receives the I/O request specifying the LU 6, the core 212BX responsible for the port A accepts the I/O request (FIG. 5 (14)). Here, the core responsible for the LU 6 is not the core 212BX which has accepted the I/O request but the core 212AX. Therefore, a CPU cross call occurs. That is, the I/O request is transferred from the CPU of the core 212BX to the CPU of the core 212AX (FIG. 5 (15)). The core 212AX which has accepted the I/O request executes I/O for the LU 6 ((16) in FIG. 5).

In the computer system according to this embodiment, control is performed so that the cross call described above does not occur as far as possible. The outline of the computer system will be described below.

Figure 6:
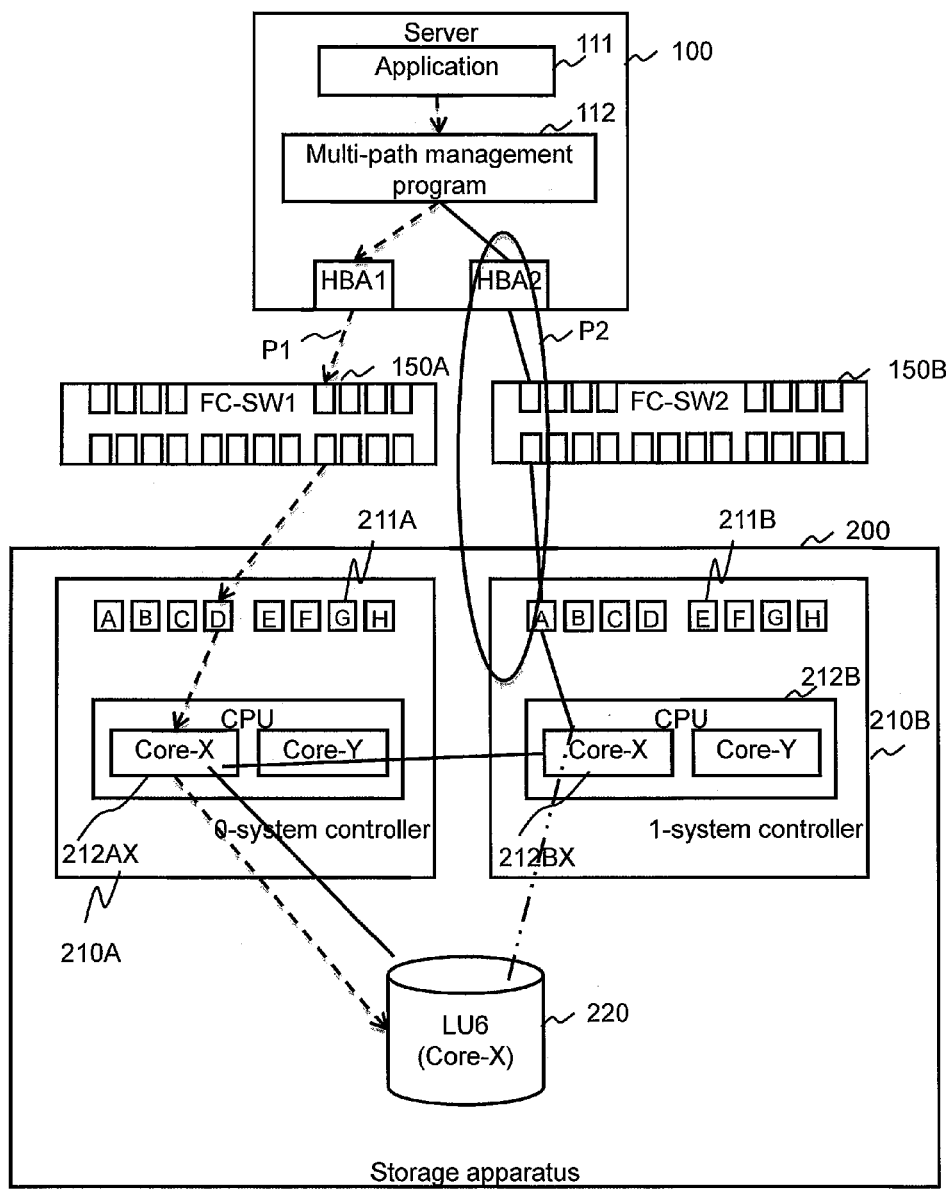
FIG. 6 is a first diagram illustrating the outline of a computer system according to the embodiment.

FIG. 6 is a first diagram illustrating the outline of the computer system according to the embodiment.

There are prepared, for example, a path P1 via HBA1 of a server 100, FC-SW1 and the port D of the 0-system controller 210A, and a path P2 via HBA2 of the server, FC-SW2 and the port A of the 1-system controller 210B, as paths to the LU 6.

The multi-path management program 112 acquires information indicating which controller and core are responsible for which LU, from the storage apparatus 200 and stores the information in a storage resource (for example, a memory) in the server 100. On the basis of this information, the multi-path management program 112 selects, from among multiple paths town LU specified by an I/O request from the application 111, such a path that a cross call does not occur even if the I/O request passes through the path (hereinafter referred to as a non-cross call path). In the example shown in FIG. 6, the multi-path management program 112 selects a non-cross call path in the case of transmitting an I/O request specifying the LU 6. Between the paths P1 and P2 to the LU 6, a non-cross call path to the LU 6 is the path P1 which passes through the port D for which the core 212AX responsible for the LU 6 is responsible. That is, the non-cross call path P1 is such a path that the core which accepts an I/O request received by the port D through which the path P1 passes and the core responsible for the LU 6 are the same. Thereby, it is possible to avoid occurrence of a cross call.

Figure 7:
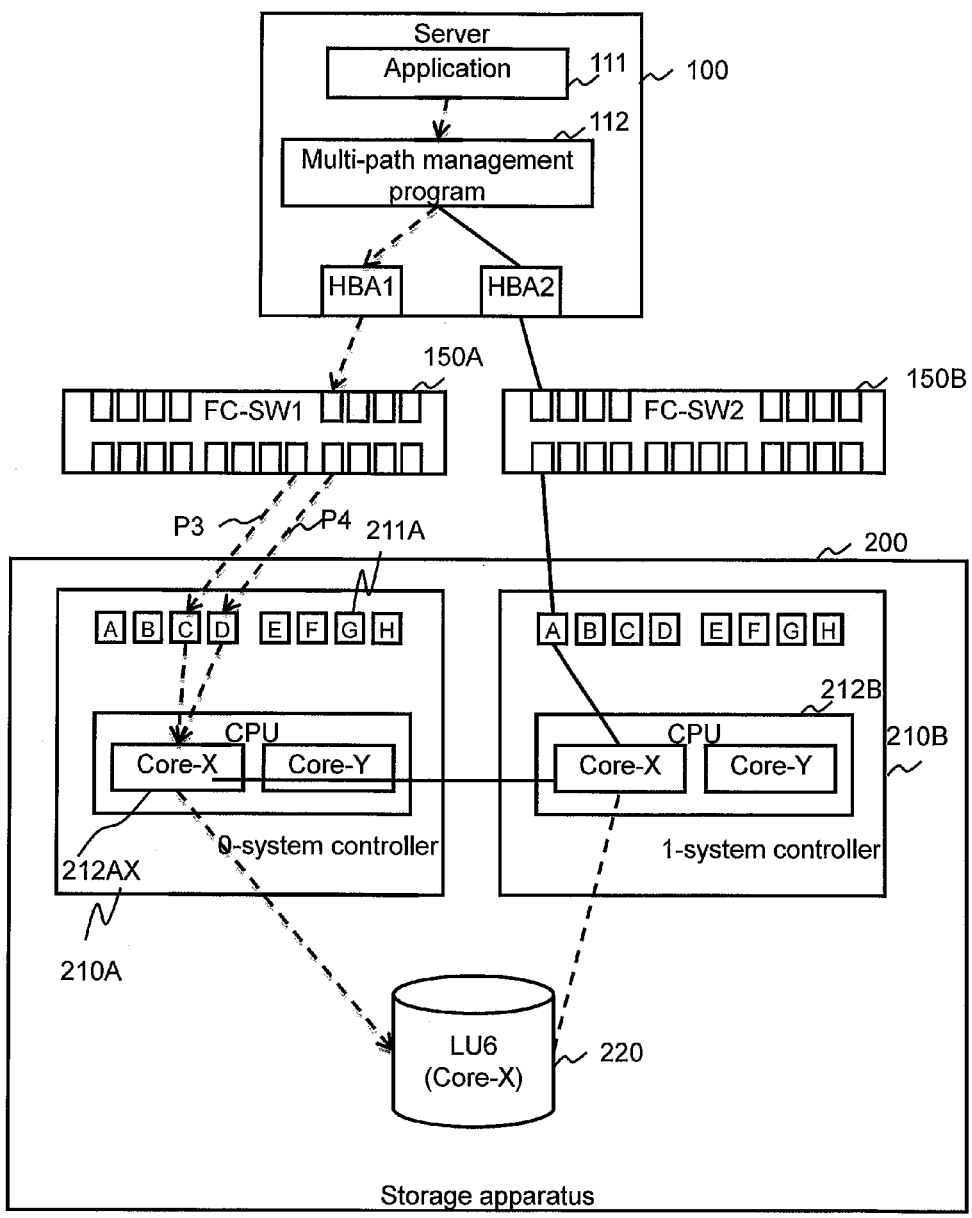
FIG. 7 is a second diagram illustrating the outline of the computer system according to the embodiment.

FIG. 7 is a second diagram illustrating the outline of the computer system according to the embodiment.

If there are multiple non-cross call paths (in the example in FIG. 7, a path P3 passing through the port C and a path P4 passing through the port D) among multiple paths to an LU 220 specified by an I/O request from the application 111, the multi-path management program 112 may change the non-cross call path to be selected from among the multiple non-cross call paths in accordance with a predetermined method such as a round-robin method.

Next, the outline of a process performed when a fault occurs in the storage apparatus 200 and the outline of a process performed at the time of recovery of the fault will be described.

Figure 8:
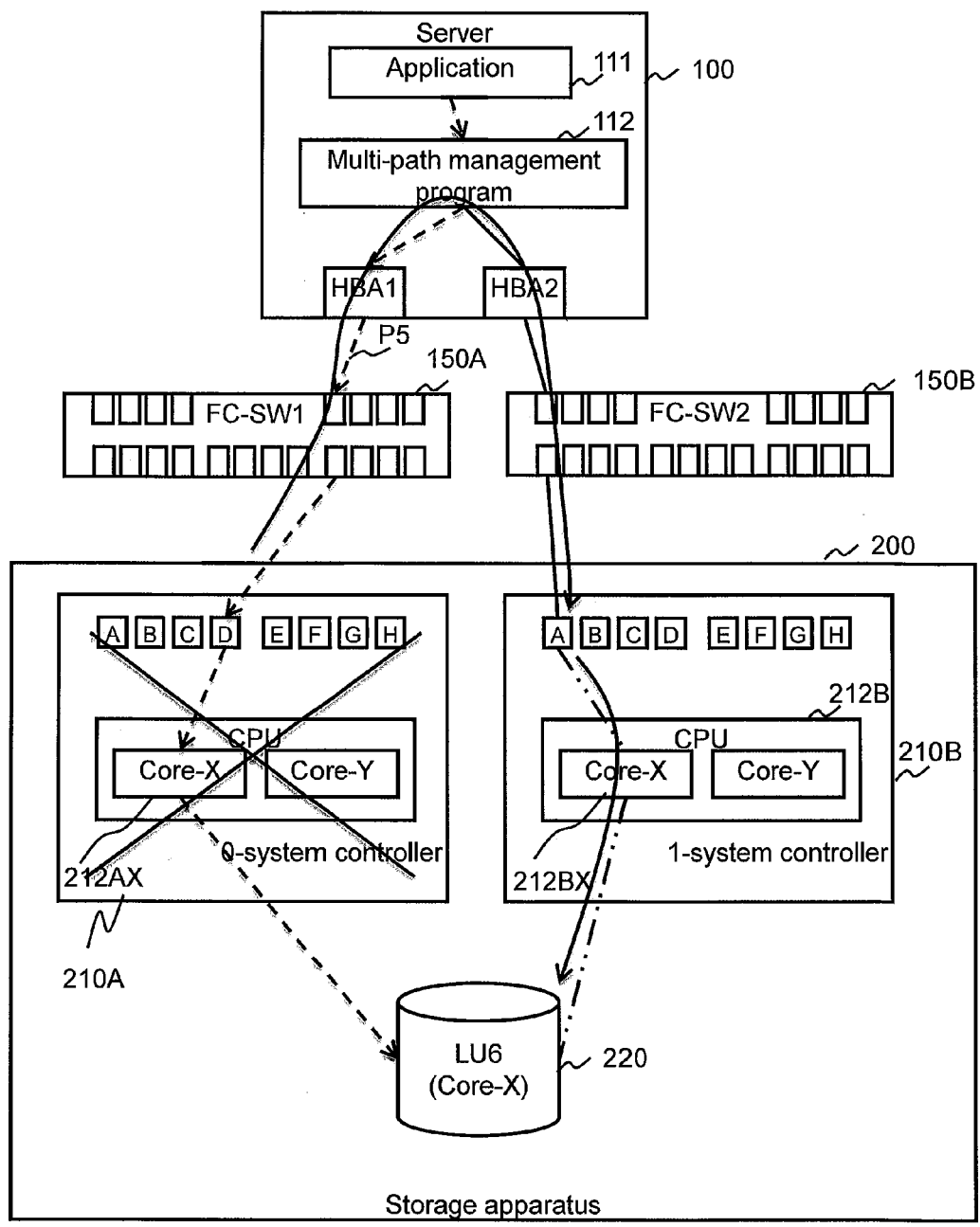
FIG. 8 is a third diagram illustrating the outline of the computer system according to the embodiment.
Figure 9:
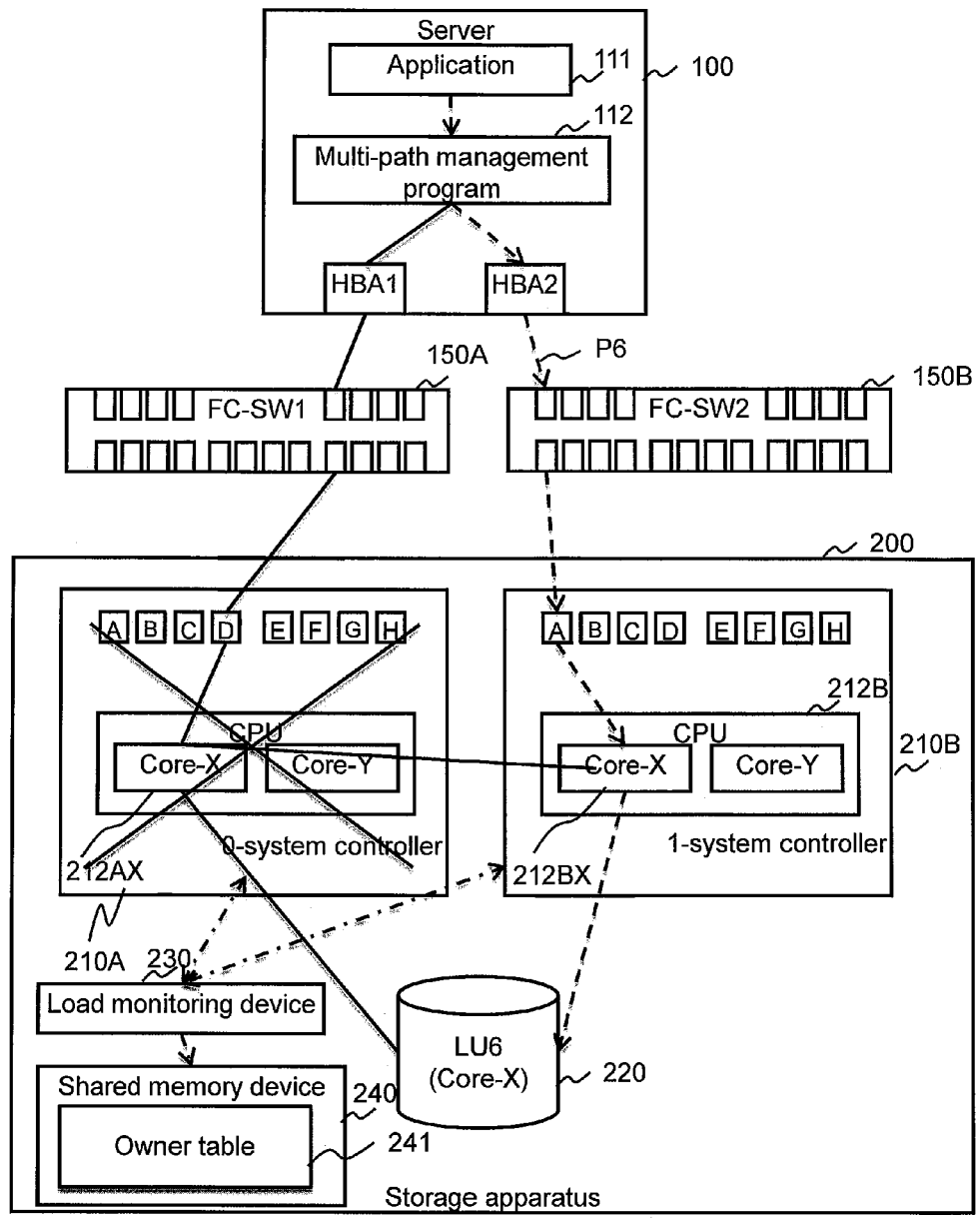
FIG. 9 is a fourth diagram illustrating the outline of the computer system according to the embodiment.
Figure 10:
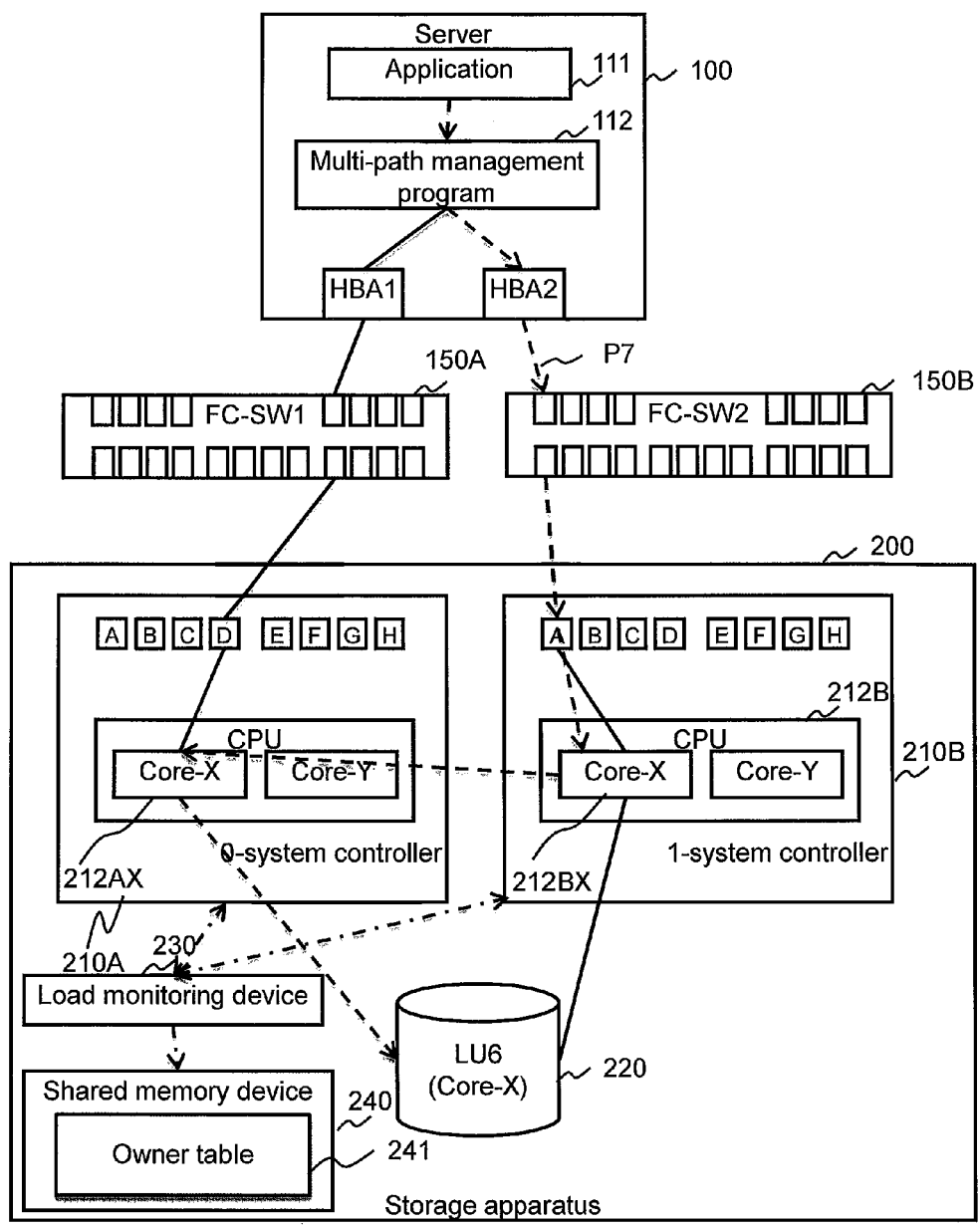
FIG. 10 is a fifth diagram illustrating the outline of the computer system according to the embodiment.
Figure 11:
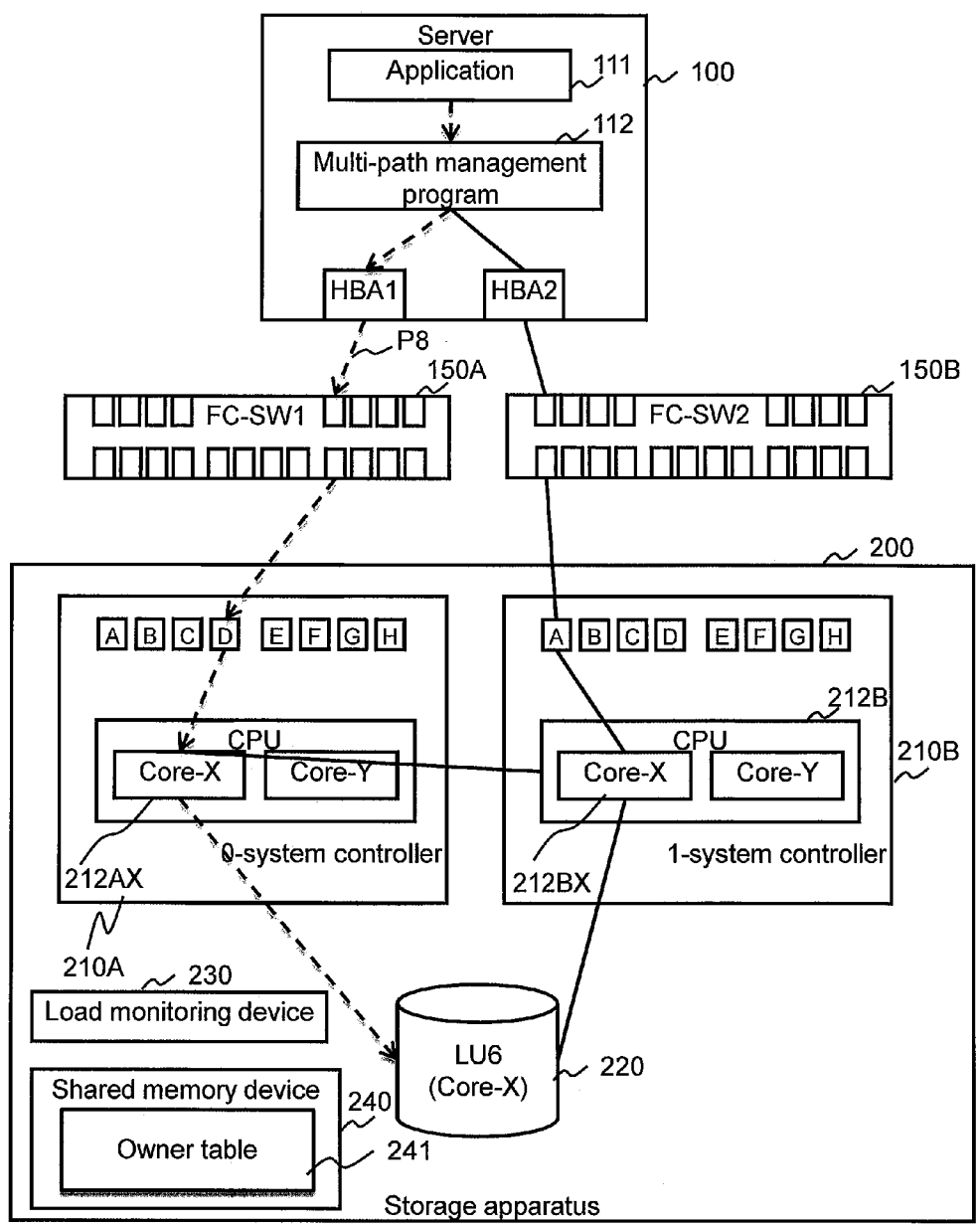
FIG. 11 is a sixth diagram illustrating the outline of the computer system according to the embodiment.

FIG. 8 is a third diagram illustrating the outline of the computer system according to the embodiment. FIG. 9 is a fourth diagram illustrating the outline of the computer system according to the embodiment. FIG. 10 is a fifth diagram illustrating the outline of the computer system according to the embodiment. FIG. 11 is a sixth diagram illustrating the outline of the computer system according to the embodiment.

If a fault occurs in the 0-system controller 210A when the multi-path management program 112 transmits an I/O request using a path P5 as shown in FIG. 8, the multi-path management program 112 selects a path for transmitting the I/O request to the 1-system controller 210B (for example, a path P6) as shown in FIG. 9.

If a fault occurs in the 0-system controller 210A, a core of the 1-system controller 210B (for example, the core 212BX) is configured as a responsible core for the LU 6 as a substitute for a core of the 0-system controller 210A, in the storage apparatus 200 as shown in FIG. 9.

Here, if the 0-system controller 210A of the storage apparatus 200 recovers from the fault, the load of each of the controllers (210A and 210B) is monitored by the load monitoring device 230, and, for example, the responsibility for the LU 6 is returned to the core 212AX in order to distribute the load of each controller, as shown in FIG. 10.

Since, immediately after the responsible core is changed, the I/O request is transmitted from the server 100 via a path P7, the core 212BX of the 1-system controller 210B receives the I/O request, and a CPU cross call (the I/O request is transferred from the core 212BX to the core 212AX which is responsible for the LU 6) occurs. The server 100 acquires information about which core is responsible for an I/O for which LU (hereinafter referred to as responsible core identification information). Therefore, the server 100 acquires information (a controller number and a core number) identifying the core responsible for the LU 6 which has been changed.

As described above, after acquiring the information identifying the changed core, the multi-path management program 112 selects a non-cross call path P8 as a pass for transmitting an I/O request specifying the LU 6, and the I/O request is transmitted to the core 212AX responsible for the LU 6, as shown in FIG. 11. Thereby, a cross call is avoided.

Next, the computer system according to the embodiment will be described in detail.

Figure 12:
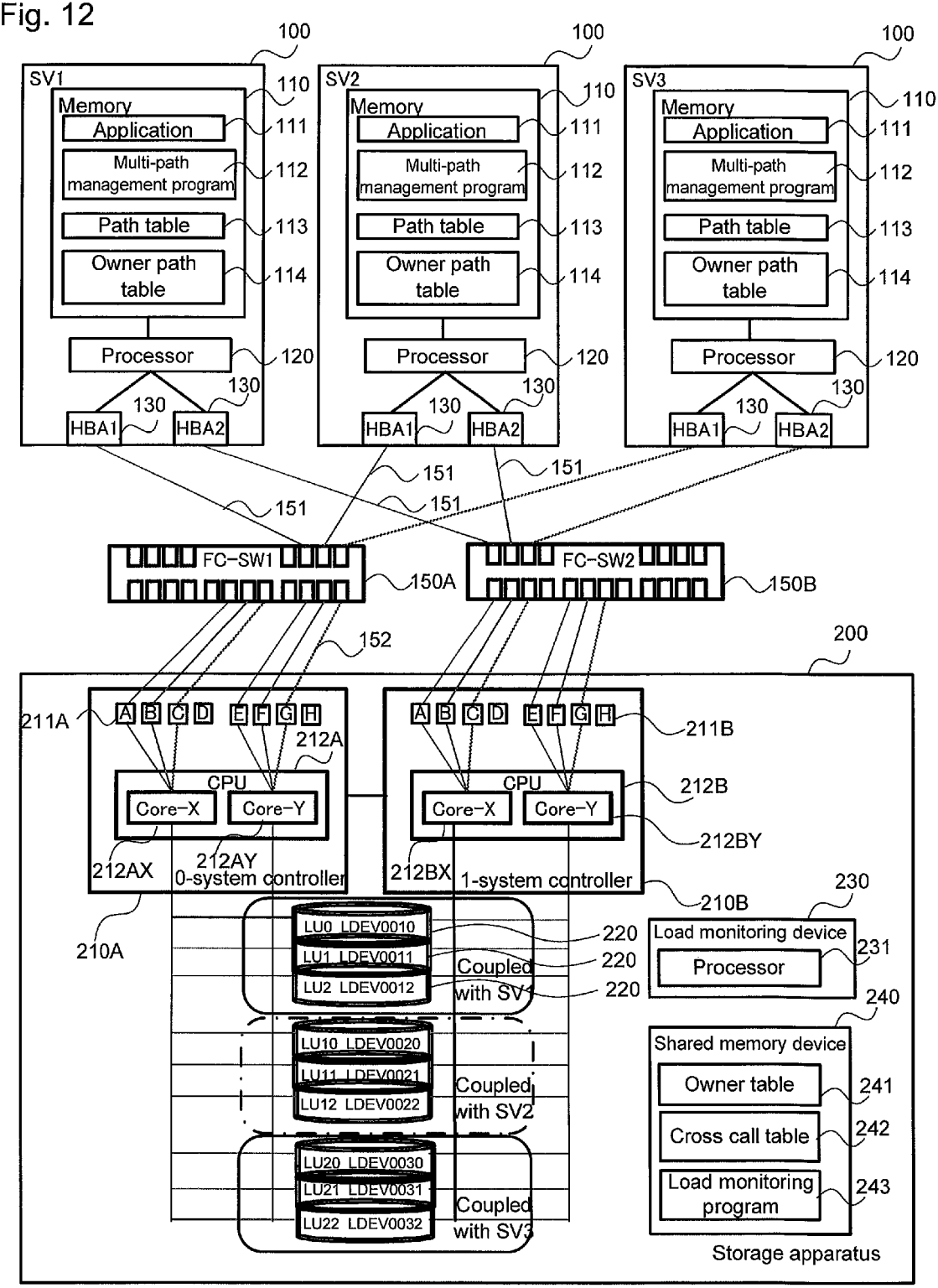
FIG. 12 is a block diagram of the computer system according to the embodiment.

FIG. 12 is a block diagram of the computer system according to the embodiment.

The computer system includes one or more servers 100, one or more storage apparatuses 200, multiple switches 150 (150A and 150B) coupling the one or more servers 100 and the one or more storage apparatuses 200. The servers 100 and the switches 150 are coupled, for example, by optical fiber cables. The switches 150 and the storage apparatuses 200 are coupled, for example, by optical fiber cables.

The switch 150 is, for example, a switch which mutually couples apparatuses (the server 100, the storage apparatus 200 and the like) compatible with a fibre channel. In this embodiment, each of the switches 150A and 150B is coupled with the multiple servers 100. The switch 150A is coupled with multiple ports 211A of the 0-system controller 210A of the storage apparatus 200. The switch 150B is coupled with multiple ports 211B of the 1-system controller 210B of the storage apparatus 200.

The server 100 includes a communication interface device, a storage device and a control device coupled therewith. The communication interface device is, for example, an HBA (Host Bust Adapter) 130. There are multiple HBAs 130. The storage device is, for example, a memory 110. The control device is, for example, a CPU 120.

The memory 110 stores the application 111, the multi-path management program 112, a path table 113, and an owner path table 114.

The application 111 is a program for executing predetermined work processing and issues an I/O request of data related to the work processing, which is an I/O request for an LU 220 of the storage apparatus 200 (strictly, for example, a logical storage device recognized by the LU 220 being mounted). The multi-path management program 112 realizes a function of selecting one path from among multiple paths to an LU specified by an I/O request from the application 111, a function of, when detecting a fault of the path to be selected, selecting a path other than the path and transmitting the I/O request via the path, a function of appropriately changing the path to be selected from among the multiple paths, a function of closing any path, and the like. The path table 113 includes information about paths to an LU 220. The owner path table 114 includes information identifying a controller and a core responsible for an LU 220 (responsible core identification information).

The CPU 120 executes various kinds of processes by executing a program stored in the memory 110. At that time, the tables 113 and 114 are appropriately referred to.

The HBA 130 is an adapter compatible with a fibre channel and intermediates communication with an external apparatus (the storage apparatus 200 and the like). When the HBAs 130 in the server 100 are to be distinguished from each other, they may be expressed as "HBA1" and "HBA2". In this embodiment, the HBA 1 is coupled with the switch 150A, and the HBA 2 is coupled with the switch 150B.

The storage apparatus 200 includes multiple controllers 210 (the 0-system controller 210A and the 1-system controller 210B), multiple LUs 220, a load monitoring device 230, a shared memory device 240 and multiple PDEVs. A storage area based on the multiple PDEV may be any real LU among the multiple LUs 220 or may be a storage area assigned to a virtual LU among the multiple LUs 220.

The share memory device 240 stores an owner table 241, a cross call table 242, and a load monitoring program 243. The owner table 241 is a table for managing cores which are responsible for I/O processing for the LUs 220. The cross call table 242 includes information about cross calls which have occurred. The load monitoring program 243 is a program for regularly or irregularly executing a load monitoring process. The load monitoring process may include, for example, identifying the load (for example, the activity ratio) of each controller 210, changing a core responsible for an LU 220 according to the identified load, and updating the owner table 241 according to the change of the core responsible for the LU 220. In this embodiment, the load monitoring program 243 determines which core is to be responsible for which LU 220 so that the activity ratios of the cores are balanced.

The load monitoring device 230 includes a CPU 231. The CPU 212 of the controller 210 may be used instead of the CPU 231 (that is, at least one CPU 212 may execute the load monitoring process in addition to I/O for the LUs, without the existence of the CPU 231). The CPU 231 executes the load monitoring process by executing the load monitoring program 243 stored in the shared memory device 240.

As described before, the LU 220 may be a virtual LU or a real LU. The real LU may be an LU based on a RAID group configured by multiple PDEVs.

In FIG. 12, as LUs 220 provided for SV 1 (server 1), there are an LU 0 (LDEV 0010), an LU 1 (LDEV 0011) and an LU 2 (LDEV 0012). As LUs 220 provided for SV 2 (server 2), there are an LU 10 (LDEV 0020), an LU 11 (LDEV 0021) and an LU 12 (LDEV 0022). As LUs 220 provided for an SV 3 (server 3), there are an LU 20 (LDEV 0030), an LU 21 (LDEV 0031) and an LU 22 (LDEV 0032). An "LDEV" is a logical storage device, and it is substantially the same as an LU. Specifically, in this embodiment, a storage apparatus includes, for an LU, an LU number which is identification information specified by a server, and an LDEV number which is identification information used inside the storage apparatus.

The 0-system controller 210A includes multiple (for example, eight from A through H) ports 211A and CPUs 212A. Since the configuration of the 1-system controller 210B is similar to that of the 0-system controller 210A, description thereof will be omitted here.

The port 211A is a port compatible with a fibre channel (a CHA port), and it intermediates communication with other apparatuses. Here, in the case of describing the multiple ports, distinguishing them from one another, they may be expressed as port A, B, . . . , H.

The CPU 212A includes multiple cores 212AX and core 212AY. Each of the cores 212AX and core 212AY may be expressed as "Core-X" and "Core-Y", respectively. Each of the cores 212AX and 212AY can independently operate, and, for example, it executes communication processing using the port 211A and I/O for an LU 220. In this embodiment, for each core, a port for which the core is responsible for and an LU for which the core is responsible for are specified. In other words, for each port, a port responsible core, which is a core to accept an I/O request received by the port, is specified, and, for each LU, an LU responsible core, which is a core to execute I/O for the LU, is specified. Specifically, a port responsible core responsible for ports A through D, is the core 212AX, and a port responsible core responsible for ports E through H, is the core 212AY.

Each of the cores 212AX and 212AY is communicably coupled with PDEVs, and, when performing I/O for an LU, transmits an I/O request to a PDEV which includes a physical storage area (a storage area in the PDEV) corresponding to an I/O destination LU area (an area in the LU). In this embodiment, however, for an I/O destination LU 220, an LU responsible core, which is responsible for the LU 220, executes I/O. The LU responsible core can be changed under the control of the load monitoring device 230.

FIG. 13 is a diagram showing an example of a path table of the server 1 according to the embodiment. FIG. 14 is a diagram showing an example of a path table of the server 2 according to the embodiment. FIG. 15 is a diagram showing an example of a path table of the server 3 according to the embodiment. The path tables of the servers 1, 2, and 3 have a similar configuration, and information stored in each path table is information corresponding to each server.

For each path, the path table 113 includes the following information:
(*) a path ID 113a, which is an ID uniquely identifying the path;
(*) a vendor name 113b indicating the vendor name of the storage apparatus 200 including a port through which the path passes;
(*) a product name 113c indicating the product name of the storage apparatus 200 having the port through which the path passes;
(*) a product number 113d indicating the product number of the storage apparatus 200 having the port through which the path passes;
(*) an LU number 113e, which is an LU number of an LU 220 connected with the path;
(*) an LDEV number 113f, which is the LDEV number of the LU 220 connected with the path;
(*) a path status 113g indicating the status of the path;
(*) a CHA port 113h, which is the number of the port through which the path passes;
(*) an accepting controller number 113i, which is the number of a controller having a port responsible core responsible for the port through which the path passes; and
(*) a port responsible core number 113J, which is the number of the port responsible core responsible for the port through which the path passes.

The value of the path status 113g is, for example, "Online" indicating that the path is enabled and "Offline" indicating that the path is disabled. The value of the port responsible core number 113J is, for example, "X" meaning Core-X and "Y" meaning Core-Y.

Here, an example of a method for collecting the various kinds of information held by the path table 113 will be described.

For example, in a predetermined case, such as at the time of activating the server 100, an OS (Operating System) of the server 100, which is not shown, transmits a request for acquiring LU list information, to each port of the storage apparatus 200 from the HBA 130. As a response to the acquisition request, a response including the LU list information is sent from the storage apparatus 200 to the server 100. The LU list information includes information (information including a vendor name, a product name, a product number, an LU number, an LDEV number, and the like) about LUs associated with the ports which received the acquisition request. Next, the multi-path management program 112 transmits an inquiry request (for example, an Inquiry command) including an LU number included in the acquired LU list information. As a response to the inquiry request, a response which includes identification information (an accepting controller number and a port responsible core number) of a port responsible core responsible for the port which has accepted the inquiry request, and identification information about an LU responsible core responsible for an LU identified by the LU number included in the inquiry request are sent from the storage apparatus 200 to the server 100. The multi-path management program 112 stores information included in the LU list information and the information included in the response to the inquiry request, into the path table 113. If multiple paths to the LU specified by the inquiry request include cross call paths and non-cross call paths, the multi-path management program 112 selects a cross call path and acquires the inquiry request via the cross call path. This is because, a non-cross call path is preferentially used at the time of transmitting an I/O request. A cross call path is a path where a cross call occurs. Specifically, as the cross call paths, there are a core cross call path, which is such a path that the LU responsible core and the port responsible core are different cores but are in the same CPU, and a CPU cross call path, which is such a path that the LU responsible core and the port responsible core are in different CPUs. A non-cross call path is such a path that the LU responsible core and the port responsible core are the same.

According to the example of the path table 113, identification information about the storage apparatus is configured by a vendor name, a product name, and a product number. The vendor name, the product name, and the product number of the storage apparatus 200 are "HIT", "600F", and "9300080", respectively. According to the example of the path table 113 shown in FIG. 13, there are four paths indicated by path IDs "00001", "00004", "00007" and "00010" as paths to the LU 0. For example, the path "00001" is a path passing through a port "0A" (the port A of the 0-system controller 211A) and the port responsible core responsible for the port "0A" is the core 212AX of the 0-system controller 210A. The path "00007" is a path passing through a port "1A" (the port A of the 1-system controller 211B), and the port responsible core responsible for the port "1A", is the core 212BX of the 1-system controller 210B.

FIG. 16 is a diagram showing an example of an owner path table of the server 1 according to the embodiment. FIG. 17 is a diagram showing an example of an owner path table of the server 2 according to the embodiment. FIG. 18 is a diagram showing an example of an owner path table of the server 3 according to the embodiment. The owner path tables of the servers 1, 2, and 3 have a similar configuration, and information stored in each owner path table is information corresponding to each server.

For each path, the owner path table 114 includes the following information:
(*) a vendor name 114a indicating the vendor name of the storage apparatus 200;
(*) a product name 114b indicating the product name of the storage apparatus 200;
(*) a product number 114c indicating the product number of the storage apparatus 200;
(*) an LDEV number 114d indicating the LDEV number of an LU connected with the path;
(*) a controller number 114e indicating the number of a controller (owner controller) having an LU responsible core responsible for the LU connected with the path;
(*) an LU responsible core number 114f indicating the number of the LU responsible core responsible for the LU connected with the path; and
(*) I/O path control 114g indicating information about whether execution of path selection by the process at and after step S2 of a path selection process (see FIG. 21) is to be enabled or disabled.

For example, when information about configuration of being enabled or disabled is specified with the use of an input device of the server 100, the multi-path management program 112 stores the specified configuration information into the owner path table 114 as the I/O path control 114g. The configuration information may be specified for each LU or may specified for multiple LUs as common information.

Here, according to the owner path table 114 and the path table 113, it is possible to identify such a path that a cross call does not occur. For example, according to the owner path table 114 shown in FIG. 16 and the path table 113 shown in FIG. 13, which are stored in the server 1, it is known that, since the LU responsible core and the port responsible core are the same in the case of transmitting an I/O request using the path ID "00001", "00005" or "00009", neither a core cross call nor a CPU cross call occurs. Similarly, according to the owner path table 114 shown in FIG. 17 and the path table 113 shown in FIG. 14, which are stored in the server 2, it is known that, since the LU responsible core and the port responsible core are the same in the case of transmitting an I/O request using the path ID "00002", "00006" or "00010", neither a core cross call nor a CPU cross call occurs. Furthermore, according to the owner path table 114 shown in FIG. 18 and the path table 113 shown in FIG. 15, which are stored in the server 3, it is known that, since the LU responsible core and the port responsible core are the same in the case of transmitting an I/O request using the path ID "00003", "00007" or "00011", neither a core cross call nor a CPU cross call occurs.

Figure 19:
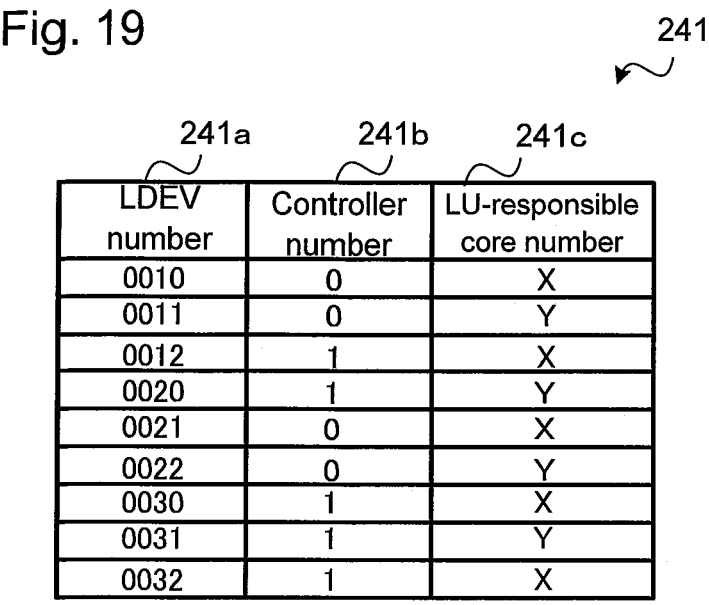
FIG. 19 is a diagram showing an example of an owner table according to the embodiment.

FIG. 19 is a diagram showing an example of the owner table according to the embodiment.

For each LU, the owner table 241 includes the following information:
(*) an LDEV number 241a indicating the LDEV number of the LU;
(*) a controller number 241b indicating the number of a controller having an LU responsible core responsible for the LU; and
(*) an LU responsible core number 241c indicating the number of the LU responsible core responsible for the LU.

According to the owner table 241, it is known that, for example, for an LU "0010", I/O is executed by a core "X" (the core 212AX) of a controller "0" (the 0-system controller 210A).

FIG. 20 is a diagram showing an example of a cross call table according to the embodiment.

For each occurred cross call, the cross call table 242 includes the following information:
(*) an acceptance number 242a, which is a number uniquely indicating a cross call;
(*) an LDEV number 242b indicating the LDEV number of an LU 220 specified by an I/O request due to which the cross call has occurred;
(*) an accepting controller number 242c, which is the number of a controller which has accepted the I/O request due to which the cross call has occurred;
(*) a port responsible core number 242d indicating the number of a port responsible core which has accepted the I/O request due to which the cross call has occurred;
(*) a processing controller number 242e indicating the number of a controller having a core which has executed I/O for an LU 220 specified by the I/O request due to which the cross call has occurred; and
(*) a processing-target-LU responsible core number 242f indicating the number of the core which has executed I/O for the LU 220 specified by the I/O request due to which the cross call has occurred.

According to the cross call table 242, it is known that the I/O destination of a cross call "000001" is the LU "0010", that an I/O request has been accepted by the core 212BY of the 1-system controller 210B, and that I/O has been executed by the core 212AX of the 0-system controller 210A. This also means that a result of the I/O by the core 212AX is returned to the core 212BY and transmitted to the I/O request transmission source by the core 212BY. That is, the cross call table 242 is used to return a response through the same route as the route through which an I/O request flowed in accordance with a cross call.

Next, a process performed in the computer system according to the embodiment will be described.

First, a process using the owner table 241 and the cross call table 242 executed by the cores 212AX, 212AY, 212BX and 212BY will be described.

If a port responsible core (for example, any of 212AX, 212AY, 212BX and 212BY) accepts an I/O request from a port (211A or 211b), the port responsible core refers to the owner table 241 and identifies an LU responsible core responsible for an I/O destination LU (an LU specified by the I/O request) 220 (the core of a controller responsible for I/O for the LU 220).

As a result, if the identified LU responsible core is a port responsible core, the port responsible core executes I/O for the I/O destination LU 220. On the other hand, if the identified LU responsible core is not a port responsible core, the port responsible core executes the following process:
(*) adding a new record to the cross call table 242;
(*) setting the number of the controller having the port responsible core, in the record as the accepting controller number 242c;
(*) setting the number of the port responsible core, in the record as the port-responsible core number 242d;
(*) setting the number of the controller having the identified LU responsible core, in the record as the processing controller number 242e;
(*) setting the number of the identified LU responsible core, in the record as the processing-target-LU responsible core number 242f; and
(*) handing over the accepted I/O request to the identified LU responsible core.

The LU responsible core which has received the I/O request executes I/O in accordance with the I/O request for the I/O destination LU 220. The LU responsible core refers to the cross call table 242 and hands over a processing result to the I/O request transfer source port responsible core. The core which has received the processing result transmits a response including the processing result, to the server 100 which is the I/O request transmission source via a port for which the core is responsible for (the port which has accepted the I/O request).

Next, a process by the server 100 will be described.

Figure 21:
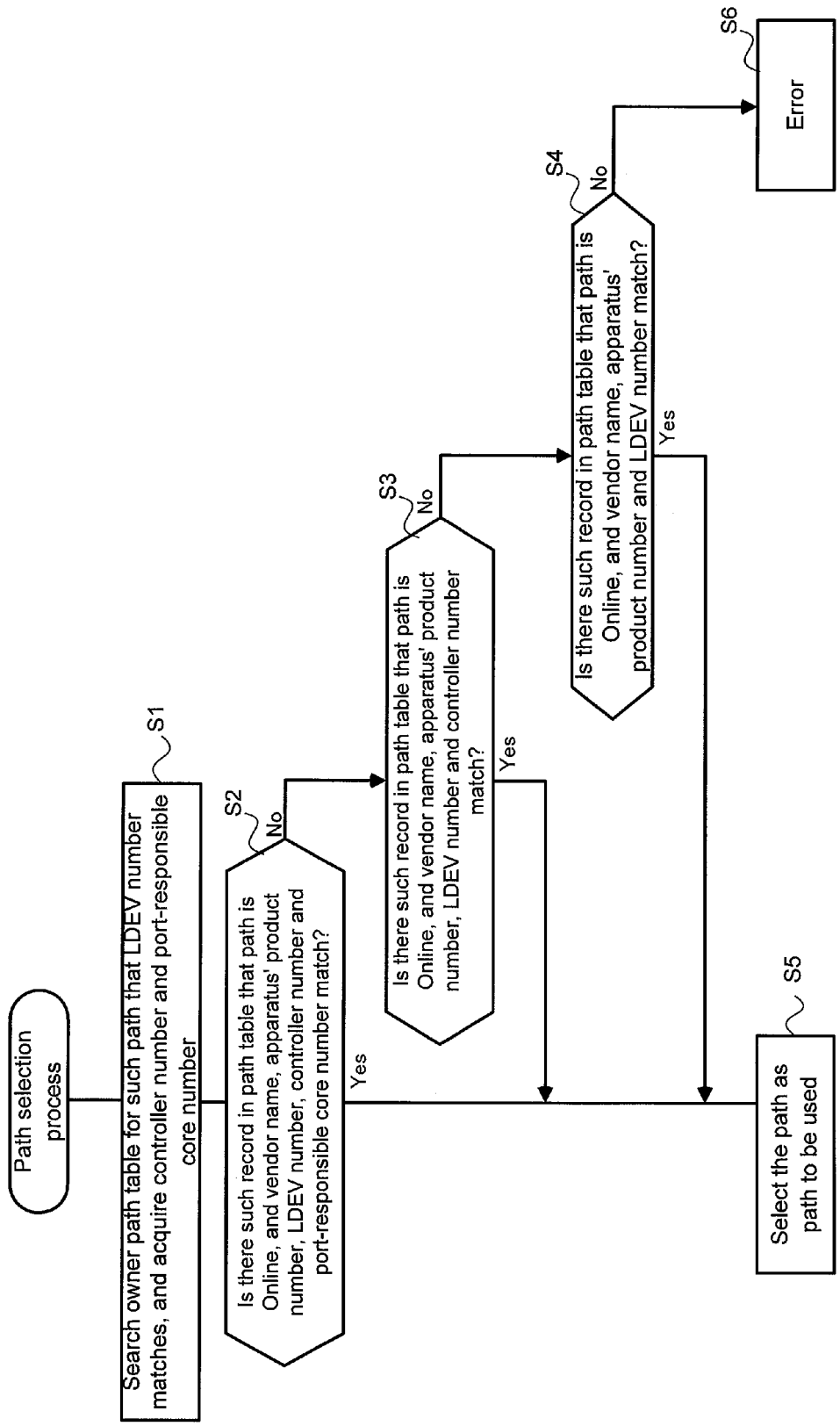
FIG. 21 is a flowchart of a path selection process according to the embodiment.

FIG. 21 is a flowchart of a path selection process according to the embodiment.

The path selection process is executed when the multi-path management program 112 of the server 100 accepts an I/O request from the application 111.

The multi-path management program 112 searches the owner path table 114 for such a record that the LDEV matches an LDEV number corresponding the LU number of an I/O destination LU (the LU specified by the I/O request), and acquires a controller number and an LU responsible core number from the record (step S1). The process at and after step S2 is executed if the value of the I/O path control 114g of the record is effective (ON). If the value of the I/O path control 114g of the record is ineffective (OFF), the multi-path management program 112 selects, for example, a path indicated by such a record that the path status 113g in the path table 113 is Online and the LDEV number of the I/O destination LU matches in accordance with a predetermined method such as a round-robin method.

At step S2, the multi-path management program 112 judges whether or not there is a record which satisfies all the following conditions in the path table 113:

(*) the path status 113g is Online;
(*) having a vendor name 113b, a product number 113c and an LDEV number 113d corresponding to the vendor name, the product number and the LDEV number of the I/O destination LU; and
(*) having a controller number 113i and an LU responsible core number 113j corresponding to the controller number and the LU responsible core number acquired at step S1.

If there is a corresponding record at step S2 (step S2: Yes), it means that the path is a non-cross call path (such a path that the LU responsible core responsible for the I/O destination LU and the port responsible core responsible for a port through which the path passes through are the same). Therefore, the multi-path management program 112 selects the path as a path used at the time of transmitting the I/O request (step S5). After that, the multi-path management program 112 transmits the I/O request via the path. Thereby, it is possible to avoid occurrence of a cross call at the time of processing of the I/O request.

On the other hand, if there is not a corresponding record at step 2 (step S2: No), the multi-path management program 112 judges whether or not there is a record which satisfies all the following conditions in the path table 113 (step S3):
(*) the path status 113g is Online;
(*) having a vendor name 113b, a product number 113c and an LDEV number 113d corresponding to the vendor name, the product number and the LDEV number corresponding to the I/O destination LU; and
(*) having a controller number 113i corresponding to the controller number acquired at step S1.

If there is a record which satisfies the conditions at step S3 (step S3: Yes), it means that the path is a core-cross call path (such a path that the LU responsible core responsible for the I/O destination LU and the port responsible core responsible for the port through which the path passes are different from each other but are in the same CPU). Therefore, the multi-path management program 112 selects the path as a path used at the time of transmitting the I/O request (step S5). After that, the multi-path management program 112 transmits the I/O request via the path. Thereby, when the I/O request is transmitted, it is possible to, though a core cross call occurs, avoid occurrence of a CPU cross call the load of which is higher than that of the core cross call in the storage apparatus 200.

On the other hand, if there is not a corresponding record at step 3 (step S3: No), the multi-path management program 112 judges whether or not there is a record which satisfies all the following conditions in the path table 113 (step S4):
(*) the path status 113g is Online; and
(*) having a vendor name 113b, a product number 113c and an LDEV number 113d corresponding to the vendor name, the product number, and the LDEV number of the I/O destination LU.

If there is a corresponding record at step S4 (step S4: Yes), the multi-path management program 112 selects the path as a path used at the time of transmitting the I/O request (step S5). After that, the multi-path management program 112 transmits the I/O request using the path. Thereby, when the I/O request is transmitted, a CPU cross call occurs in the storage apparatus 200.

On the other hand, if there is not a corresponding record at step S4 (step S4: No), a path to the I/O destination LU 220 does not exist, and, therefore, the multi-path management program 112 responds an error to the I/O request transmission source application 111 (step S6).

According to the path selection process described above, a non-cross call path is preferentially identified and selected. If there is not a non-cross call path, a core-cross call path is preferentially identified and selected. If there is neither a non-cross call path nor a core-cross call path, a CPU-core cross call path is selected.

Figure 22:
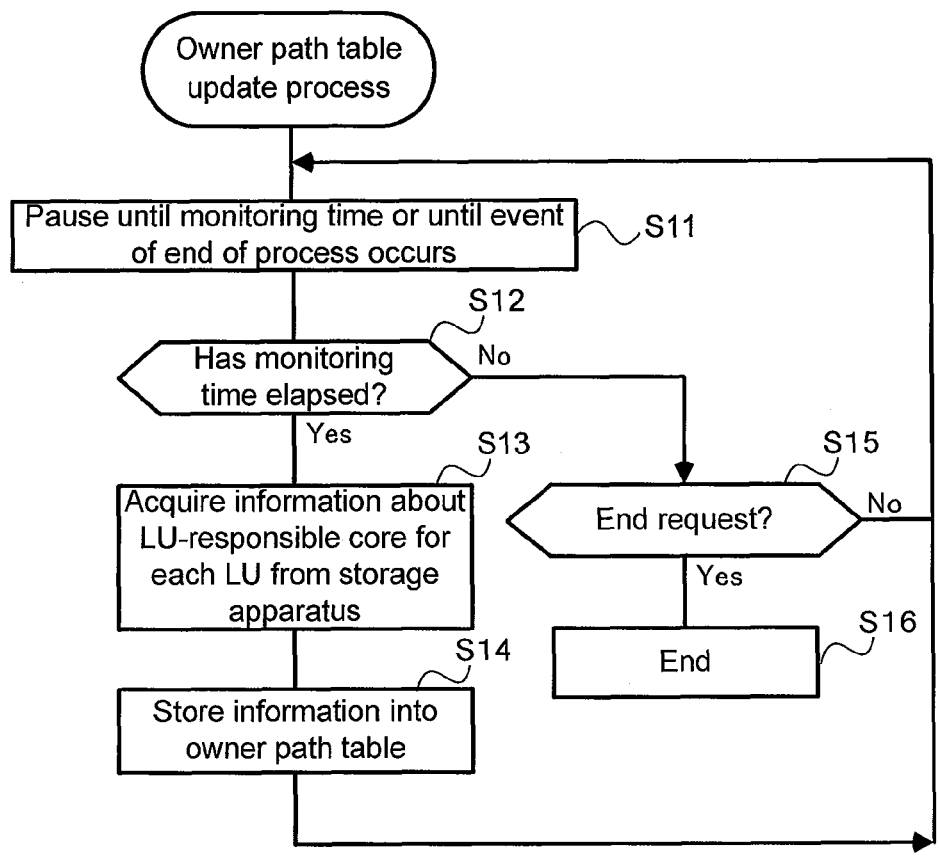
FIG. 22 is a flowchart of an owner path table update process according to the embodiment.

FIG. 22 is a flowchart of an owner path table update process according to the embodiment.

The owner path table update process is executed, for example, when the application 111 is executed.

The multi-path management program 112 pauses processing when a predetermined monitoring time (a second time interval) has elapsed or until an event of end of the owner path table update process occurs (step S11). When the monitoring time elapses or when the process end event occurs, the multi-path management program 112 judges whether the monitoring time has elapses or not. Here, the monitoring time is determined, for example, as described below. That is, the storage apparatus 200 is configured to perform, for each LU, a responsible core changing process (a process for judging whether or not it is necessary to change the LU responsible core responsible for the LU and, if a result of the judgment is positive, changes the LU responsible core responsible for the LU at a first time interval. In this case, the monitoring time (the second time interval) is longer than the first time interval. For example, it may be an integral multiple (for example, three times or more) of the first time. The first time interval, which is the execution interval of the responsible core changing process, may be changed via an input/output console of the storage apparatus 200. The server 100 may be notified of the changed first time interval by the storage apparatus 200 or may inquire the storage apparatus 200 of it. The multi-path management program 112 of the server 100 may change the monitoring time (the second time interval) on the basis of the changed first time interval.

When the monitoring time has elapsed (step S12: Yes), the multi-path management program 112 acquires the owner controller number and owner LU responsible core number of each LU 220 from the storage apparatus 200. For example, the multi-path management program 112 may include the LU numbers of LUs managed by the storage apparatus 200 into an Inquiry command (SCSI request) and transmit it to the storage apparatus 200. When the storage apparatus 200 receives this command, a CPU core which has received the command may identify an LDEV number corresponding to the LU number in the command, acquire the owner controller number and owner-LU responsible core number of a corresponding LU 220 from the owner table 241, register the acquired owner controller number and owner-LU responsible core number with a vendor unique field in a response to the command, and transmit the response to the multi-path management program 112.

Here, a path selected by the multi-path management program 112 as a path through which the Inquiry command passes may be any path that enables an I/O request specifying an LU corresponding to the LU number in the Inquiry command to pass through. Among such paths that enable the I/O request to pass through, a CPU cross call path may be preferentially identified and selected. If there is not a CPU cross call path, a core cross call path may be preferentially identified and selected. If there is neither a CPU cross call path nor a core cross call, a non-cross call path may be selected. Thereby, it is expected to reduce the decrease in the performance of processing the I/O request specifying the LU 220 corresponding to the LU number in the Inquiry command.

Next, the multi-path management program 112 stores the acquired owner controller number and owner-LU responsible core number into the record of the corresponding LU 220 in the owner path table 113 (step S14) and advances the process to step S11. Thereby, the owner path table 113 can be updated to the latest information.

On the other hand, if the monitoring time has not elapsed (step S12: No), the multi-path management program 112 judges whether a process end event has occurred or not (step S15). If the process end event has occurred (step S15: Yes), the multi-path management program 112 ends the multi-path table update process. On the other hand, if the process end event has not occurred (step S15: No), the multi-path management program 112 advances the process to step S11.

Description has been made on the basis of an embodiment. However, the present invention is not limited to the embodiment described above and is applicable to other various aspects.

For example, in the above embodiment, description has been made with a storage apparatus provided with multiple CPUs having multiple cores as an example. However, the present invention is not limited thereto. For example, a storage apparatus provided with multiple CPUs having one core or a storage apparatus provided with one CPU having multiple cores is also possible.

Furthermore, though the server 100 is configured to acquire information which includes the numbers of an LU responsible core and a controller having the LU responsible core by performing polling to the storage apparatus 200 in the above embodiment, it is also possible for the storage apparatus to, when changing an LU responsible core, transmit information which includes the number of the changed LU responsible core and a controller having the changed LU responsible core, to the server 100 so that the owner path table 114 may be updated by the server 100 on the basis of the received information.

Furthermore, identification information about an LU responsible core (for example, the number of a controller and the number of the LU responsible core) is acquired via a path through which an I/O request passes in the above embodiment, it is also possible, for example, for the storage apparatus 200 and the server 100 to be also coupled with another communication network different from a communication network through which communication in accordance with a fibre channel is performed, and transmit and receive an Inquiry command for acquiring identification information about an LU responsible core and a response thereto (a response which includes identification information about the LU responsible core) through that another communication network.

REFERENCE SIGNS LIST

100 . . . server, 200 . . . storage apparatus

The invention claimed is:

1. A computer system comprising:
a storage apparatus; and
a server configured to transmit an I/O (Input/Output) request to the storage apparatus,
wherein the storage apparatus comprises multiple ports communicable with the server, multiple processor cores and multiple LUs (Logical Units),
wherein, for each port, a port responsible core, which is a processor core to accept an I/O request received by the port, is specified,
wherein, for each LU, an LU responsible core, which is a processor core responsible for I/O, is specified,
wherein the storage apparatus is configured to judge whether or not it is necessary to change the LU responsible core, and if a result of the judgment is positive, perform a responsible core changing process, which is a process for changing the LU responsible core, at a first time interval,
wherein the server comprises one or more communication interface devices, a storage device, and a control device coupled therewith,
wherein the storage device is configured to store path information which includes, for each path, information about the path from the communication interface device to an LU and LU responsible core information which includes, for each LU, identification information about an LU responsible core,
wherein the path information includes, for each path, identification information about a port responsible core responsible for a port through which the path passes,
wherein the control device is configured to, by transmitting a responsible core notification request, which is a request for identification information about LU responsible cores responsible for the LUs, acquire the identification information about the LU responsible cores from the storage apparatus at a second time interval, and include the identification information into the LU responsible core information,
wherein the control device is configured to, when transmitting an I/O request:
(A) select a non-cross call path, which is such a path that the LU responsible core and the port responsible core are the same processor core, from among multiple paths to an I/O destination LU, which is an LU specified by the transmission target I/O request, on the basis of the path information and the LU responsible core information; and
(B) transmit the transmission target I/O request via the path selected at the step (A).

2. A computer system according to claim 1,
wherein the storage apparatus comprises multiple processors each of which comprises the two or more processor cores, and
wherein the control device is configured to:
(a1) if the non-cross call path is included in the multiple paths to the I/O destination LU, select the non-cross call path;
(a2) if the non-cross call path is not included in the multiple paths to the I/O destination LU, and a core cross call path, which is such a path that the LU responsible core and the port responsible core are in the same processor, is included, select the core cross call path; and
(a3) if neither the non-cross call path nor the core cross call path is included in the multiple paths to the I/O destination LU, select a processor cross call path, which is such a path that the LU responsible core and the port responsible core are in different processors,
in the step (A).

3. A computer system according to claim 2,
wherein the control device is configured to transmit an inquiry request for acquiring information about an LU, to the storage apparatus,
in the case of transmitting the inquiry request, if the processor cross call path is included in paths to the LU specified by the inquiry request, select the processor cross call path, if the core cross call path is included though the processor cross call path does not exist, select the core cross call path,
and transmit the inquiry request via the selected path.

4. A computer system according to claim 3,
wherein the second time interval is longer than the first time interval.

5. A computer system according to claim 4,
wherein the second time interval is an integral multiple of the first time interval.

6. A computer system according to claim 5,
wherein the control device is configured to, if the second time interval is changed, change the first time interval on the basis of the changed second time interval.

7. A computer system according to claim 6,
wherein the responsible core notification request for a certain LU is transmitted via a path to non-responsible core among paths to the certain LU, and
wherein the path to non-responsible core is a path to a processor core different from an LU responsible core of the certain LU identified on the basis of the LU responsible core information.

8. A computer system according to claim 1,
wherein the control device is configured to transmit an inquiry request for acquiring information about an LU, to the storage apparatus, and
wherein if a cross call path, which is such a path that the LU responsible core and the port responsible core are different from each other, is included in paths to the LU specified by the inquiry request in the case of transmitting the inquiry request, select the cross call path, and transmit the inquiry request via the selected path.

9. A server configured to transmit an I/O (Input/Output) request to a storage apparatus, comprising:
one or more communication interface devices;
a storage device; and
a control device coupled therewith,
wherein the storage apparatus comprises multiple ports communicable with the server, multiple processor cores and multiple LUs (Logical Units),
wherein, for each port, a port responsible core, which is a processor core to accept an I/O request received by the port, is specified,
wherein, for each LU, an LU responsible core, which is a processor core responsible for I/O, is specified,
wherein the storage apparatus is configured to judge whether or not it is necessary to change the LU responsible core, and if a result of the judgment is positive, perform a responsible core changing process, which is a process for changing the LU responsible core, at a first time interval,
wherein the storage device is configured to store path information which includes, for each path, information about the path from the communication interface device to an LU and LU responsible core information which includes, for each LU, identification information about an LU responsible core,
wherein the path information includes, for each path, identification information about a port responsible core responsible for a port through which the path passes,
wherein the control device is configured to, by transmitting a responsible core notification request, which is a request for identification information about LU responsible cores responsible for the LUs, acquire the identification information about the LU responsible cores from the storage apparatus at a second time interval, and include the identification information into the LU responsible core information,
wherein, the control device is configured to, when transmitting an I/O request:
(A) select a non-cross call path, which is such a path that the LU responsible core and the port responsible core are the same processor core, from among multiple paths to an I/O destination LU, which is an LU specified by the transmission target I/O request, on the basis of the path information and the LU responsible core information; and
(B) transmit the transmission target I/O request via the path selected at the step (A).

10. A server according to claim 9,
wherein the second time interval is longer than the first time interval.

11. A server according to claim 9,
wherein the control device is configured to, if the second time interval is changed, change the first time interval on the basis of the changed second time interval.

12. A server according to claim 9,
wherein the responsible core notification request for a certain LU is transmitted via a path to non-responsible core among paths to the certain LU, and
wherein the path to non-responsible core is a path to a processor core different from an LU responsible core of the certain LU identified on the basis of the LU responsible core information.

13. A server according to claim 9,
wherein the control device is configured to transmit an inquiry request for acquiring information about an LU, to the storage apparatus,
wherein if a cross call path, which is such a path that the LU responsible core and the port responsible core are different from each other, is included in paths to the LU specified by the inquiry request in the case of transmitting the inquiry request, select the cross call path, and transmit the inquiry request via the selected path.

14. A method for inputting/outputting data to/from an LU (Logical Unit) of a storage apparatus,
wherein the storage apparatus comprises multiple ports communicable with a server, multiple processor cores and multiple LUs,
wherein, for each port, a port responsible core, which is a processor core to accept an I/O (Input/Output) request received by the port, from the server, is specified,
wherein for each LU, an LU responsible core, which is a processor core responsible for I/O, is specified,
wherein the storage apparatus is configured to judge whether or not it is necessary to change the LU responsible core, and if a result of the judgment is positive, perform a responsible core changing process, which is a process for changing the LU responsible core, at a first time interval,
wherein the server is configured to, by transmitting a responsible core notification request, which is a request for identification information about LU responsible cores responsible for the LUs, acquire the identification information about the LU responsible cores from the storage apparatus at a second time interval, and include the identification information into LU responsible core information which includes, for each LU, identification information about the LU responsible core,
wherein the server is configured to, when transmitting an I/O request:
(A) select a non-cross call path, which is such a path that the LU responsible core and the port responsible core are the same processor core, from among multiple paths to an I/O destination LU, which is an LU specified by the transmission target I/O request, on the basis of the LU responsible core information and path information which includes, for each path, identification information about the port responsible core of a port through which the path passes and includes information about the path; and (B) transmit the transmission target I/O request via the path selected at the step (A).

15. A computer system comprising:

a storage apparatus comprising a plurality of processor cores; and at least one server, each comprising a server processor and at least one communication interface device coupled to at least two of the processor cores and the server processor via multiple paths, wherein the server is configured to:

acquire LU (Logical Unit) responsible core information, which corresponds to an identification of an LU provided by the storage processor cores and the identification of a storage processor core which is responsible for each LU, from the storage apparatus, specify a LU responsible processor core which is responsible for an LU that is a target of an I/O (Input/Output) request by using the LU responsible core information, select a path, which is connected to the specified LU responsible core, from among multiple paths, by selecting a non-cross call path, which is such a path that the LU responsible core and a port responsible core of the storage apparatus are the same processor core, from among multiple paths to an I/O destination LU, which is an LU specified by a transmission target I/O request, on the basis of the path information and the LU responsible core information; and; and transmit the I/O request to the storage apparatus via the selected path.

* * * * *